US012209845B2

(12) United States Patent
Adrain

(10) Patent No.: US 12,209,845 B2
(45) Date of Patent: Jan. 28, 2025

(54) NETWORKED ANTI-BALLISTIC PROTECTIVE SYSTEM AND METHOD

(71) Applicant: Disruptive Defenses, LLC, Westlake, OH (US)

(72) Inventor: John B. Adrain, Spokane, WA (US)

( * ) Notice: Subject to any disclaimer, the term of this patent is extended or adjusted under 35 U.S.C. 154(b) by 13 days.

(21) Appl. No.: 17/968,523

(22) Filed: Oct. 18, 2022

(65) Prior Publication Data

US 2023/0243625 A1 Aug. 3, 2023

Related U.S. Application Data

(63) Continuation-in-part of application No. PCT/US2021/027973, filed on Apr. 19, 2021, which is a continuation-in-part of application No. 17/006,442, filed on Aug. 28, 2020, now Pat. No. 11,733,005.

(60) Provisional application No. 63/017,563, filed on Apr. 29, 2020, provisional application No. 62/929,467, filed on Nov. 1, 2019, provisional application No. 62/911,323, filed on Oct. 6, 2019, provisional application No. 62/895,734, filed on Sep. 4, 2019,
(Continued)

(51) Int. Cl.
*F41H 5/007* (2006.01)
*F41H 5/08* (2006.01)
*G08B 13/196* (2006.01)

(52) U.S. Cl.
CPC ............... *F41H 5/007* (2013.01); *F41H 5/08* (2013.01); *G08B 13/19619* (2013.01); *G08B 13/19656* (2013.01)

(58) Field of Classification Search
CPC ........................................................ F41H 5/007
See application file for complete search history.

(56) References Cited

U.S. PATENT DOCUMENTS

| | | | |
|---|---|---|---|
| 2,149,481 | A | 3/1939 | Bosch |
| 2,962,696 | A | 11/1960 | Snyder |
| 3,936,822 | A | 2/1976 | Hirschberg |

(Continued)

FOREIGN PATENT DOCUMENTS

WO WO 2015/042653 4/2015

OTHER PUBLICATIONS http://blog.modernmechanix.com/venetian-blinds-of-steel/; Modern Mechanix; Venetian Blinds of Steel (Oct. 1937).

(Continued)

*Primary Examiner* — Reginald S Tillman, Jr.
(74) *Attorney, Agent, or Firm* — Bodi Law LLC

(57) ABSTRACT

An kinetic object protection system for protecting a space in a building or vehicle from a threat, the system including a plurality of smart devices at least one of which is connected to a remote server, the system for protecting the space by deploying a protective barrier including one or more sheets having a lightweight, flexible, ballistic resistant material, such as woven sheets, nets, or mesh. A plurality of sheets may be laminated together by using a glue, heat weld, or stitching or some other laminating process. The system includes an automated control system operably configured to, upon detection of the threat, cause a change in state of the barrier from a retracted state to a protective deployed state. The barriers are adapted to be resistant to penetration by the kinetic objects such as vehicles, moving persons, bullets, or shrapnel, for example.

22 Claims, 11 Drawing Sheets

Related U.S. Application Data provisional application No. 62/892,899, filed on Aug. 28, 2019.

(56) References Cited

U.S. PATENT DOCUMENTS

| | | | | |
|---|---|---|---|---|
| 4,588,223 | A | 5/1986 | Ledenyi | |
| 4,608,717 | A | 9/1986 | Dunbavand | |
| 5,097,885 | A | 3/1992 | Kitagawa | |
| 5,188,161 | A | 2/1993 | Erber | |
| 5,370,035 | A | 12/1994 | Madden, Jr. | |
| 5,756,922 | A | 5/1998 | Fuller | |
| 5,917,775 | A | 6/1999 | Salisbury | |
| 5,939,658 | A | 8/1999 | Muller | |
| 6,125,905 | A | 10/2000 | Woodside et al. | |
| 6,176,050 | B1 | 1/2001 | Gower | |
| 6,296,039 | B1 | 10/2001 | Mullet | |
| 6,298,766 | B1 | 10/2001 | Mor | |
| 6,325,085 | B1 | 12/2001 | Gower | |
| 6,412,391 | B1 | 7/2002 | Stevens | |
| 6,607,693 | B1 | 8/2003 | Saito | |
| 6,862,970 | B2 | 3/2005 | Aghajanian | |
| 7,694,482 | B2 | 4/2010 | Gazaway | |
| 7,980,166 | B1 | 7/2011 | Fuqua | |
| 8,082,970 | B2 | 12/2011 | Gower | |
| 9,134,097 | B1 | 9/2015 | De Gaglia | |
| 9,360,281 | B1 | 6/2016 | De Gaglia | |
| 9,741,221 | B1 * | 8/2017 | Rehfeld | G08B 29/16 |
| 10,928,166 | B2 * | 2/2021 | Brennan | F41H 5/013 |
| 10,942,011 | B1 * | 3/2021 | Zea | F41H 5/013 |
| 11,125,537 | B2 * | 9/2021 | Riden | G08B 7/06 |
| 2001/0021443 | A1 | 9/2001 | Bornemann | |
| 2009/0071604 | A1 | 3/2009 | Moeyersons | |
| 2009/0241318 | A1 | 10/2009 | Howard | |
| 2009/0308543 | A1 | 12/2009 | Kates | |
| 2010/0043195 | A1 | 2/2010 | Howard | |
| 2010/0043292 | A1 | 2/2010 | Wilkins et al. | |
| 2010/0164743 | A1 | 7/2010 | Domel et al. | |
| 2011/0203451 | A1 | 8/2011 | Turpin | |
| 2011/0239850 | A1 | 10/2011 | Raiser | |
| 2012/0036988 | A1 | 2/2012 | Daniels | |
| 2012/0325127 | A1 | 12/2012 | Adrain | |
| 2013/0062024 | A1 | 3/2013 | Huang | |
| 2014/0045561 | A1 | 2/2014 | Liu | |
| 2014/0260937 | A1 | 9/2014 | Whitaker | |
| 2015/0000825 | A1 | 1/2015 | Crook et al. | |
| 2015/0225996 | A1 | 8/2015 | Maksan | |
| 2016/0219254 | A1 | 7/2016 | Hu et al. | |
| 2019/0259378 | A1 | 8/2019 | Krishna et al. | |

OTHER PUBLICATIONS

European Standard EN 1523: Windows, doors, shutters and blinds Bullet resistance—Test method. Feb. 1999.

European Standard EN 1522: Windows, doors, shutters and blinds Bullet resistance—Requirements and classification. Feb. 1999.

European Standard EN 12216:2002: Shutters, external blinds, internal blinds—Terminology, glossary and definitions. Dec. 1, 2002.

* cited by examiner

NETWORKED ANTI-BALLISTIC PROTECTIVE SYSTEM AND METHOD

CROSS-REFERENCES TO RELATED APPLICATIONS

This application is a continuation-in-part of PCT application PCT/US 2021/027973 filed on Apr. 19, 2021, which claims the benefit of U.S. provisional patent application 63/017,563 filed on Apr. 29, 2020 and U.S. patent application Ser. No. 17/006,442 filed on Aug. 28, 2020. U.S. application Ser. No. 17/006,442 claims the benefit of U.S. provisional application 62/892,899 filed on Aug. 28, 2019, U.S. provisional application 62/895,734 filed on Sep. 4, 2019, U.S. provisional application 62/911,323 filed on Oct. 6, 2019, U.S. provisional application 62/929,467 filed on Nov. 1, 2019, and U.S. Provisional Application 63/017,563, filed on Apr. 29, 2020, all incorporated herein by reference.

This application incorporates all of the material disclosed in U.S. patent application Ser. No. 16/215,162, and its parent applications U.S. patent application Ser. No. 15/050,639 filed on Feb. 23, 2016 which is a continuation-in-part of U.S. patent application Ser. No. 14/476,206 filed on Sep. 3, 2014, which claims the benefit of U.S. Provisional Application No. 61/873,073, filed on Sep. 3, 2013, and also claims the benefit of U.S. Provisional Application No. 62/119,510 filed on Feb. 23, 2015, all of which are incorporated herein by reference in their entirety.

BACKGROUND

This application relates generally a networking system for controlling and deploying automated anti-ballistic barriers and anti-personnel barriers that can be provided in buildings, vehicles, and other items and locations to add anti-ballistic properties to those items and locations in order to protect a space from a kinetic object that may be of substantial mass as well as protection against bullets, and other types of high-velocity projectiles.

Conventional approaches for protection against moving objects having substantial kinetic energy, such as vehicles, running personnel, rockets, bullets and/or shrapnel, involve the use of heavy, rigid materials that are fixed in place and provide a barrier based on their rigidity, heft, and strength. However, such items often transmit the energy of the projectiles through the material into the item or location being protected, or because the energy is not properly dissipated, the projectile may still have sufficient energy to penetrate the barrier in a dangerous manner, or because of the heavy weight the barrier cannot be quickly deployed.

Needed is a way to re-enforce the strength of doors, protect windows, and other barriers against ballistic threats, vehicle threats, or threats from other personnel using lightweight but strong materials networked with other protection systems.

Furthermore, deployment of such barriers need to be automated in a manner that integrates with other protective systems (e.g., fire alarms, burglar alarms, entry detection systems, etc.), monitoring systems (e.g., video surveillance) and smart speaker systems (e.g. voice activated systems using smart speakers like Amazon Echo®, Sonos One®, Apple HomePod®, Google Nest®, etc.).

Needed is a way to network all protective systems together to better protect people and property from attack and invasion, and to protect spaces from theft, burglary, fire, etc.

SUMMARY

Provided are a plurality of example embodiments, including, but not limited to, a system for protecting a space from a threat, including an automated barrier deployment system connected to a plurality of smart monitoring devices distributed in or around the space for detecting the threat.

Also provided is a system for protecting a space from a threat, comprising: a plurality of monitoring devices distributed about and/or around the space, at least one of said monitoring devices being configured to access a remote server, said monitoring devices configured for monitoring the space for threat data indicating one or more potential threats; a controller for receiving information from the plurality of monitoring devices, said controller being configured for analyzing the threat data to determine if a potential threat exists; and at least one deployable barrier comprising a flexible anti-ballistic material, wherein upon detecting that a potential threat exists, the deployable barrier is deployed into a protective state.

Further provided is the above system wherein said monitoring devices includes one or more smart speakers, doorbells, video systems, burglar systems, and/or another monitoring system.

Also provided is the above system wherein said deployable barrier is comprised of a laminate including a plurality of sheets of anti-ballistic material, and wherein said barrier is comprised in a window shade or a door.

Still further provided is a method for protecting a space from a threat, comprising the steps of:

- monitoring said space using a plurality of monitoring devices distributed about and/or around said space for detecting threat data, at least one of said monitoring devices being configured to access a remote server;
- each of said monitoring devices transmitting its threat data to a controller;
- said controller analyzing said transmitted threat data for determining if a potential threat exists; and
- upon determining that a potential threat exists, deploying a deployable barrier including an anti-ballistic material.

Also provided is the above method, wherein at least one of said monitoring devices is a smart speaker configured to interact with one or more individuals within said space.

Further provided is the above method, wherein said flexible anti-ballistic material is comprised of a plurality of layers of anti-ballistic material laminated together.

Still further provided is the above method further comprising the step of, upon detecting that the potential threat exists, deploying a repelling substance by a repellant deployment device to repel or disable an intruder.

Also provided is the above method further comprising the step of notifying safety personnel that said potential threat exists.

Even further provided is the above method, wherein said threat data includes data detecting a gunshot.

Still further provided is the above method, wherein said threat data includes data detecting a breaking glass.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Figure 1:
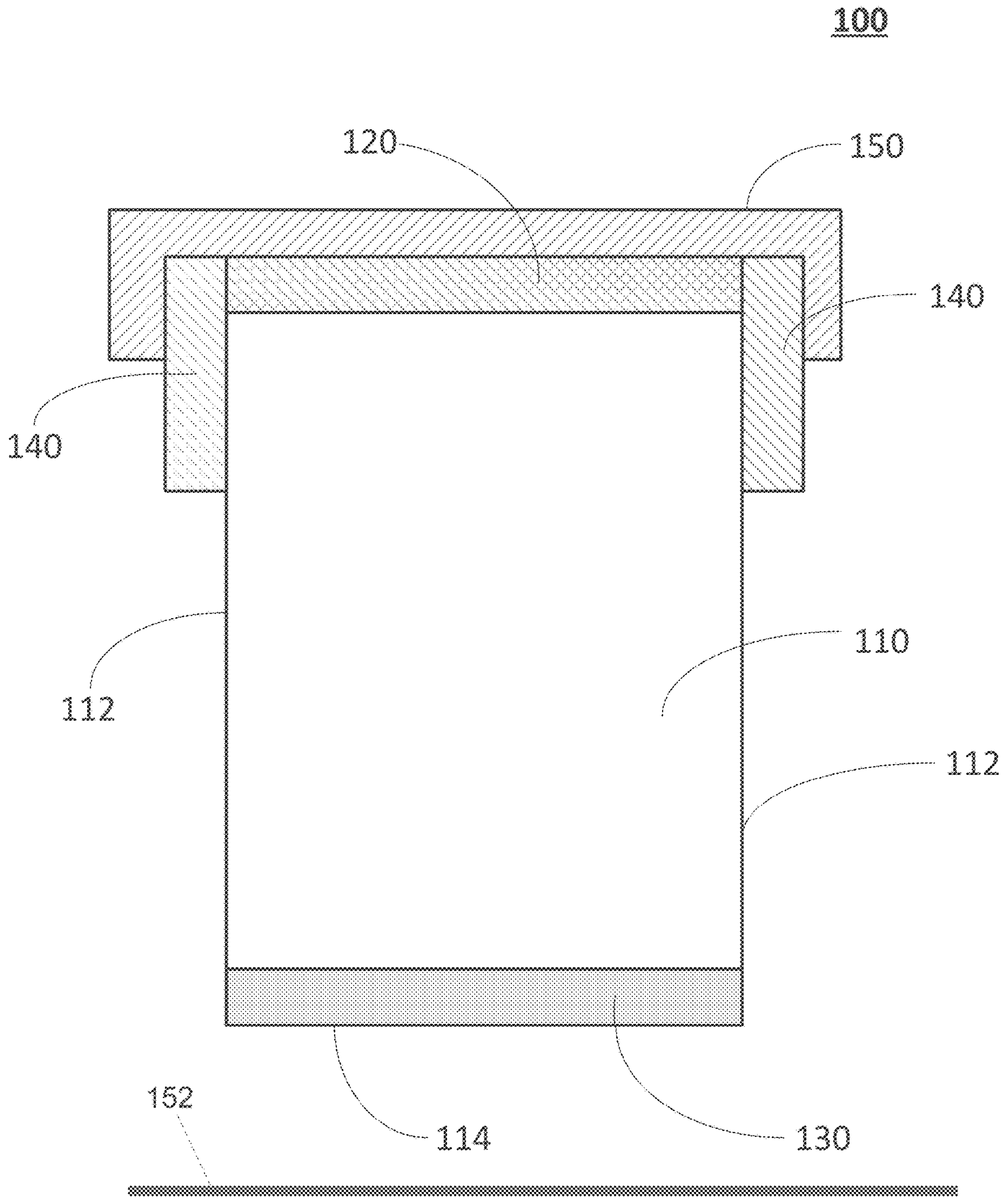
FIG. 1 illustrates an example of a generic drop-down deployable barrier.

There are various proposals for improving ballistic protection of individuals and interior spaces in buildings and vehicles as discussed in the related patent applications listed at the beginning of this application and incorporated by reference into this disclosure. The inventor has, as discussed in previous applications, discovered that a problem with many current solutions to protective systems is that the protection devices don't absorb much of the energy that is contained in the ballistic projectiles, such as shrapnel or bullets that have been fired, or larger objects of having substantial kinetic energy, such as vehicles, rockets, missiles, thrown rocks, launched arrows, or running personnel, for example. The inventor has determined that one solution to this problem is to allow the protective device, such as a screen, panel, shroud, blind, or other deployable barrier to hang freely, perhaps in a weighted manner, which allows the barrier to flex, vibrate, flow, sway and otherwise move in response to receiving the projectile, thereby dissipating some of the energy from the projectile that otherwise would remain as kinetic energy. This reduces the amount of damage and potential penetration of the projective with respect to a given amount of projection. Alternatively, the barrier may be secured on a portion of its periphery, such as along sides or a bottom (to avoid pushing aside the barrier), while allowing the main body of the barrier to flex, bow, oscillate, and/or vibrate to absorb kinetic energy.

As shown in U.S. patent application Ser. No. 16/215,162 and its related parents and other applications referenced herein, all incorporated herein by reference, various deployable barriers using non-metallic anti-ballistic materials can be formed for use as barriers, such as window blinds and similar barriers that might be provided at various locations in buildings. Use in windows, doorways, hallways, and other interior locations is a deployable barrier utilizing anti-ballistic materials that is stowed when not needed, and hence provides a way to protect various interior spaces within buildings without obstructing normal use. Furthermore, barriers can be provided within vehicles in either deployable or fixed manners (or both). Deployable barriers might be used to protect vehicle windows, doorways, hatches, and other access points, whereas permanently deployed barriers could be provided within vehicle voids such as in doors, body panels, and other locations.

Of particular interest are barriers that are lightweight and flexible in nature that can be rolled and unrolled, but that can absorb a substantial amount of kinetic energy from slower moving objects of substantial mass (such as vehicles or individuals, thrown rocks, kicked objects, etc. for example), or faster moving objects of less mass but high velocity, such as bullets, shrapnel, etc.

In some embodiments, the barriers may hang freely, not being fixed on their sides and bottoms, but that may include weights to increase their overall mass. Such barriers are free to flex and move in response to receiving a ballistic projectile, thereby converting at least a portion of the kinetic energy of the projectile into kinetic and heat energy in the barrier distributed across the entire surface area of the barrier. Allowing this free motion actually increases the effectiveness of the barrier by reducing the penetration energy of the projectile, thereby effectively improving the ability of the barrier to protect the desired person and/or interior region.

Of additional interest for at least some other embodiments are barriers that are still designed to flex and move and vibrate in interior portions, but that are fixed on their sides and/or bottoms (i.e., fixed around a perimeter or portion thereof) in order to add additional stability and strength, such as to prevent a person or large object (e.g., a vehicle) from entering a protected region or exiting a sealed region. Such barriers are still free to flex and move and otherwise dissipate energy in response to receiving a ballistic projectile in at least portion of their surface area, thereby converting at least a portion of the kinetic energy of the projectile into kinetic and heat energy in the barrier distributed across the entire surface area of the barrier. However, along with a fixed top, the fixed sides and/or bottom prevent individuals or objects from bypassing or pushing aside the barrier to get into the protected region. Hence, only the perimeter, or a portion of the perimeter, is fixed and secured, whereas an interior portion of the barrier is free to flex, vibrate, and otherwise kinetically absorb the energy of a ballistic projectile impinging on the barrier.

For example, a deployed barrier might use strong magnets or electro-magnets to secure a side, top, or bottom, while still allowing some flex and give in an interior portion. Or the barrier might be secured at one or more ends, but kept sufficiently slack to allow for movement of the main interior portion of the barrier. Hence, the barrier might be made longer or wider than the space it is intended to occupy.

Finally, of interest are also barriers that are stiff and durable, but that are lightweight by using the lightweight, but strong and durable anti-ballistic materials disclosed herein. Doors, shutters, and other types of barriers can be provided using such materials that provide both anti-ballistic protection, and that can protect spaces from undesirable entry by persons, vehicles, and other objects that might attempt access into the protected spaces. In particular, a barrier that can stop a speeding vehicle or strongly thrown or launched object having substantial kinetic energy is desired. The anti-ballistic barrier might utilize a woven or unwoven cloth, or thin solid sheets, of various anti-ballistic materials discussed herein, among others.

Furthermore, fiber cables or ropes or twines could be formed using threads or fibers made of any of the disclosed lightweight antiballistic materials, which can be used for strength re-enforcement purposes while maintaining light weights. Such ropes/cables could be used to strengthen any blinds, shutters, doors, or other barriers against penetration from larger objects such as vehicles, people, tools, etc. These materials could also be formed into mesh sheets or nets that could act similarly. In this way, blinds, shutters, doors, or other barriers can be re-enforced in order to strengthen them against larger, slower moving objects, in addition to anti-ballistic protection.

For all of these types of barriers, automated deployment (and in some cases automated retraction) is desirable, and often preferable, along with integration with other automated protection and detection systems, such as fire alarms, burglar alarms, etc. in conjunction with networked information systems like smart speakers, such as the Amazon Echo® products utilizing Alexa® applications, among others.

Figure 2:
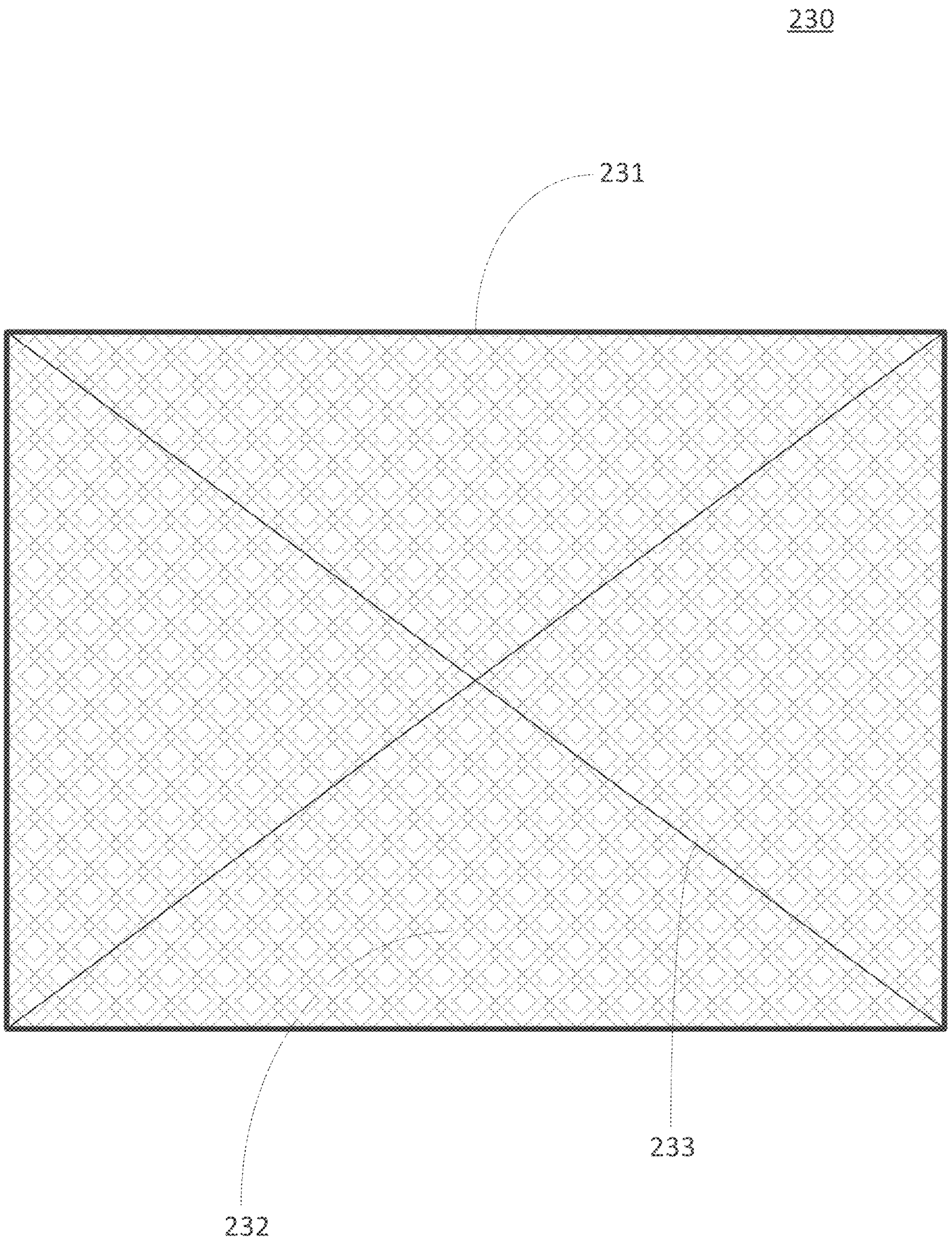
FIG. 2 illustrates an example of a generic reinforced door-type barrier.

FIG. 1 shows a schematic of an example, basic general barrier design 100 that can be adapted for use for many of these various barriers. The primary protective part is a barrier layer 110 which in many of the example embodiments will be comprised of a laminate of a plurality of layers of flexible antiballistic material (e.g., a woven or unwoven cloth, or thin sheets of material). FIG. 2 shows an example of such a laminate 400 that can be used, with an inner layer 420 that is also likely to be a laminate, and with optional outer layers 410 and 430 providing protection and/or decorative layers.

The inner layer 420 can be comprised of a plurality of layers of anti-ballistic material that might include layers including one or more of: plastic, composites, wood, metal, fabric, fiberglass or any other suitable anti-ballistic material including, but not limited to, Kevlar® (which is a synthetic fiber of high tensile strength comprised of poly-para-phenylene terephthalamide) or Lexan® (which is a transparent polycarbonate of high impact strength) or Lucite® (which is a solid transparent plastic comprised of polymethyl methacrylate) or DuPont™ Tensylon® (which is an ultrahigh molecular weight polyethylene anti-ballistic material), or a boron treated cloth, or a plexiglass with anti-ballistic properties, for example, or any combination thereof. Any type of Ultra High Molecular Weight Polyethylene could be used. Anti-ballistic gel materials such as shear thickening fluids that may be transparent can be used to saturate a material or fill voids (some of these materials harden upon impact and might be comprised of non-Newtonian fluids that that thicken in response to force). Other materials or combinations described elsewhere in this document can also be used as an alternative or supplement these materials.

Such barriers can have a variety of purposes. For example, these barriers are designed to:

- Slow down bullets;
- Stop speeding cars;
- Stop explosive Blast;
- Stop Fire, Firewall;
- Stop a rocket, missile, or other launched or thrown object;
- Prevent Eavesdropping (possibly by vibration);
- Block light;
- Provide sound;
- Noise cancelling, Active noise cancellation; and
- Surface lights could change colors, or strobe to disorient;

Also, the barriers can be comprised of various materials:

- Fabric, i.e. Kevlar®, Dynema®, Tensylon®, coated fibers, gels to fill layers for strength, can be used to keep barriers in place etc.;
- Ceramic/veneer;
- Gel to dissipate heat or stop bullet;
- Any hollow cavity can be filled with foam for strength;
- Various placements of hinges for support and movement;
- Modular Sections, acoustic panels, electrostatic speakers, flat speakers; and
- Shutter with metal, wood, veneer to make attractive and act as strike face (slat can also have thin metal edge for looks);

The barriers can also be provided of various sizes and configurations, such as vertical or horizontal; movable on their axis and turn/spin to displace energy efficiently; and panel sizes can vary on application, e.g., specifically for rolling panels.

The barriers can be placed in various locations, including: doorways; windows; hallways, vehicles; personal residences; schools/large buildings in need of security; garage doorways; alleyways; loading docks; shipping containers, and any location that needs protection against ballistic projectiles or blast shrapnel along with vehicle or personnel barriers.

All of the layers provided in the laminate 400 (that may be used as the barrier layer 100 of FIG. 1) can be secured together using any combination of a number of securing approaches, including the use of glue, heat bonding, stitching, quilting, or other means, or any combination thereof, to secure the various layers of the laminate together. Hence, the laminate can be manufactured using stitch bonder or quilting machines, leading to a multi-layered laminate having a plurality of flexible layers and leading to a flexible laminate. Note that each layer might be comprised of thin, solid sheets of any of anti-ballistic material or the material could be woven into a durable and tough and flexible fabric using threads and/or fibers of the material.

An aspect of the first surface that the bullet hits can be designed to act like a strike face, to slowdown and deform/mushroom the bullet before it hits the inside layers which then stop the projectile. For example, the outside layer can be anodized, coated, plated or treated/coated to provide the first task of slowing and deforming the bullet before it hits the layers that do the heavy lifting.

The outside strike face can have ridges or protrusions to roll the bullet. There could also be a ceramic veneer or layer to act as the strike face. The strike face layer can also be a combination of different technologies such as coating a ceramic veneer, such as to keep the weight down.

The whole barrier assembly can be spring loaded or partial break away to dissipate energy, or to move in an X, Y or Z direction. The strike faces could slide in pockets of the barrier. The hinges can be metal or composite based.

A security film can be applied to the strike face to slow down and mushroom the projectile such as a bullet. The material would not be flammable like glass and other methods currently used, would be safer for schools etc. On lightweight metal barriers or blinds (having metal slats) a coating or layer/foam, or lightweight material slides in to the extrusion or stamping.

The barrier shape can be used to change the roll of the bullet, various angles to get bullet on its side, for example. The point of the first, outer layer (other than surface decorative layer(s)) is to act as a strike face and slow down and mushroom flatten out the bullet/projectile. When glass is in front of the barrier, a security film can be applied to a surface of the glass that acts as a strike face to slow down the bullet.

On light weight metal barriers (e.g., shutters or blinds that might use slats) a coating or layer of lightweight material such as Tensylon that fastens or slides into the extrusion or stamping. The barriers could also be a clear lexan that darkens with sunlight. The barriers or shutters could also be a laminated/sage glass that darkens automatically or when electricity is applied.

Barriers can also be a shutter made of tensylon that has a metal, ceramic or wood veneer surface, to make that barriers more presentable but also act as a strike face. The slats or edges can also have a metal edge to improve the appearance. Lightweight materials light Dyneema® can act as a ladder or to keep the barriers aligned. A metal shutter can be a extrusion or stamping that the cavity is filled with a combination of materials foam, coating, Kevlar® polyurethane, or anti-ballistic gel, depending on the function of providing strength, sound dampening, strike face, decorative, etc. The fabric laminate may also be coated with various substances to help provide decorative features, or to stiffen outer layers to deform bullets, or to provide sound deadening, or otherwise provide other desirable features.

The barriers can be provided in modular sections that can deploy horizontally or vertically. The device can deploy from the top bottom or side. Sections can be provided in fabric or hinged, daisy chained, or wired together. Speakers and/or lights can be provided in various sizes.

The sections can be electrostatic or the equivalent of a thin speaker to block light sound bullet etc. (as described in more detail below). The barriers can provide light or emitted sound. Barriers, such as blinds or shutters can use speakers for security, and can block light and provide sound. Speakers can be provided to vibrate the barriers do active noise cancellation.

Barriers can be designed in a way to dissipate the energy from the shot through motion, destruction, heat dissipation, deformation, or other processes. They may sacrifice themselves much like a formula one car sacrifices itself to save the driver.

A cavity or pockets of the barriers (e.g., blinds or shutters) can be provided to house different modules according to the needs desired or a combination of elements. Slats could rotate on there axis to displace energy or change side according to purpose.

The barriers can be comprised of various layers of fabric material. The material layers may be secured to each other by stitching, quilting, gluing, welding, or merely the edges may be bound and perhaps tacked in a few spots leaving inner layers unsecured to each other, allowing motion or pockets for other uses, such as inserting materials or gels. Perhaps not stitch bonding or perhaps a very open quilt pattern.

A logo can be provided, such as using 1 inch or ¾ inch binding, or by sewing in a logo. As many as 18 plies or more of woven Kevlar® fabric or other material can be used in the laminated material. Fabric style can be 600 d Kevlar® KM2 Plus, 24×24 square yarns per inch, plain weave construction, Polyester stitching yarn, 75 denier textured yarn. Stitch pattern can be: linear chain stitch (machine direction), 3.5 gage spacing. Quilting can be used to secure the layers to each other. Layers secured only at the ends can also be utilized. It is noted that the very looseness, flexibility, and motion of the material aids in energy absorption, providing better ballistic protection and penetration avoidance. Level IIIA or better anti-ballistic protection can be achieved.

Referring back to FIG. 1, the barrier layer 110 will be fixed at one or more ends using either or both top mounting structure 120 and side mounting structures 140 to securely connect to the structure 150 of the building or vehicle. These structures will securely fix one end of the barrier layer 110 to a secure structure, such as a window or door frame, a ceiling, or vehicle panel or frame. Note that where the barrier is of a deployable embodiment, the top mounting structure 120 may include features that retract and/or store the barrier layer 110, such as disclosed in a number of the parent applications in embodiments such as deployable window blinds.

In the generic approach, as discussed above regarding FIG. 1, the barrier layer 110 will be a flexible layer that can move, vibrate, swing, and otherwise convert the kinetic energy of the ballistic projectile into kinetic and/or heat energy in the barrier 100 by nature of having barrier sides 112 and a barrier bottom 114 that are not secured to any structure in this free hanging embodiment. A weighted end 130 can be provided on the barrier layer 110 to add mass to the barrier so that the kinetic energy of the projective is also transferred to this mass as kinetic energy by moving the mass of the end 130, which can include lifting the end, swinging the end, and other types of motion. The end 130 also helps keep the barrier 100 in place by providing stability and in a deployable embodiment, may also help deploy the barrier 100 in emergency situations, as is also discussed in the parent applications.

Alternatively, the weighted end 130 might include a powerful magnet (or magnetic material), while the floor (or bottom frame) 152 contains a strong electromagnet (or vice versa) to hold the barrier in place once deployed. This can be used to help stop people or vehicle from passing the barrier by forcing the way through. The electromagnet, whether part of the barrier or the frame surrounding the barrier, can be turned on during deployment periods, and turned off to again stow the barrier. This allows very strong magnetic forces to be utilized to secure the barrier.

As an alternative, mechanical latches, locks, or other securing devices might be used instead of the electromagnet to secure the sides and bottoms of the barrier. Such latches might be automatically controlled to release the barrier for retraction, or the latches might automatically latch, but require manual release to retract the barrier.

Note that if the length of the barrier is slightly longer than the length of the region being protected, and/or the widths similarly longer, then the barrier will have sufficient slack to allow for flex and bowing to help absorb kinetic energy of objects impinging on the barrier. In this way, magnetic or mechanical latching can be used to secure the protected region while providing the benefits of a non-rigid barrier in energy absorption.

Further note that automatic deployment, based on the detection of a dangerous situation such as an explosion or gunshot (e.g., triggered by sound waves, breaking glass, light flash, or even detection of intruders, for example) can be provided as discussed in the parent applications. This automated deployment and integration with artificial intelligence and other smart speaker systems is discussed in more detail hereinbelow.

Manual deployment through activation of a motor or drop function through use of a switch, lever, or other manual activator can also be provided as an alternative or supplemental means of deployment. The weight 130, when provided, can aid in quick deployment and stability. Such barriers can be provided in windows, doorways, hallways, or even across rooms, for example.

Alternative approaches where the barrier is installed in a rising manner could also be provided. For example, posts may rise out of the ground or floor for deploying the barrier from the ground up, with the top portions free to move, or with sufficient flex in the barrier to allow freedom of motion. Such devices can protect hallways, stages, rooms, doorways, garage doors, or other locations in and out of buildings.

As an alternative, the side mounting structures 140 may be extended further, even along the entire length of the barrier sides 112, to secure the sides. Such structures may be mechanical rails or magnets that secure the deployed barrier on its sides. Grooves in a door frame or other structures could be used to secure the sides. Alternatively, linking edge structures can be provided that interlink when extended to add stiffness and structure to the sides of the barrier.

Furthermore, similar as discussed above, an optional floor structure 152 can be provided at a bottom of the barrier 100, such as on or beneath a floor, to secure the barrier bottom 114 when deployed. For example, bottom 114 may include a magnet along it's length as part of the weight 130, and the floor structure 152 could include a magnet of an opposite pole (which may be an electromagnet), to secure the bottom 114 to the floor. Alternatively, floor structure 152 might include a latch or gripping device that secures the bottom 114 to the floor. Hence, in conjunction, extended side mounting structures 140 and/or the floor structure 152 secures the barrier 100, when deployed, to prevent individuals or objects from passing beyond the barrier 100 into a protected region.

Note that automatic deployment, based on the detection of a dangerous situation such as an explosion or gunshot (e.g., triggered by sound waves, breaking glass, light flash, or even detection of intruders, for example), or a shouted command, or speeding vehicle can be provided. Manual deployment through activation of a motor or drop function through use of a switch, lever, or other manual activator can also be provided as an alternative or supplemental means of deployment. The weighted end 130, when provided, can aid in quick deployment. Such barriers can be provided in windows, doorways, hallways, or even across rooms, for example.

FIG. 2 shows an embodiment of a barrier device 230 having a strong frame 231 around a perimeter that might be made of a metal or non-metallic materials, such as an antiballistic material as disclosed herein. The frame 231 might be solid, or comprised of a chain or rope or twine including anti-ballistic materials as disclosed herein. This frame 231 can be made of woven lightweight anti-ballistic materials as discussed herein, or metallic materials could be used. Such a frame should be strongly attached to a frame or walls or a floor or other part of the building or a strong deploying structure in order to stop large, moving objects such as vehicles or large pieces of shrapnel, thrown objects, objects fired using a mortar or other launching device (e.g., tear gas canisters), etc. Or the barrier device 230 could be comprised of a plurality of slats or sections that fold for stowage, with each section individually comprising its own anti-ballistic materials.

A netting or mesh woven material 232 can be used that is comprised of the strong, light-weight anti-ballistic material disclosed herein, either formed into solid strands or woven as a rope or twine material to form a mesh having any desired gauge and gap size between strands. Solid woven materials that are flexible and lightweight can be used. Reinforcing cables or ropes or chains or bars 233 can be provided entwined or attached to the material 232 to strengthen the overall barrier 230. These reinforcing structures 233 can be made of woven lightweight anti-ballistic materials as discussed herein, or metallic materials could be used.

Such a barrier can be used in a doorway, hallway, or building vehicle or pedestrian entrance, for example, to stop vehicles, shrapnel, people, etc. from entering the interior of the building, a garage, etc.

This barrier 230 might be installed on an interior of a door, garage door, deployable shutter system, over glass, deployable blinds, etc. The barrier 230 might be installed in an interior of such items as well. The barrier 230 might be made sufficiently transparent to be installed over or on windows in either a deployable, or permanent manner. Alternatively, the barrier 230 might be deployed in hallways, entryways, as room dividers, etc., allowing deployment during emergency situations to provide ballistic protection and barriers.

Doorways or other egress/ingress or pathway locations for vehicles or personnel can also be provided that operate in a fast open and fast close embodiment, some of which involve a shutter-like design with slats, rods, or bars that roll up the door into a spiral on a retraction roll that is motorized for quick deployment and retraction. Again, a weight can be provided to provide rapid deployment and stability. Rather than, or in addition to, slats, a flexible fabric or other material, such as the anti-ballistic materials described herein, can be utilized for the door. The barrier 230, which would be made flexible to allow it to roll or fold with the door to retract and deploy, can be provided on an outer or inner surface of such a door, or it can be provided in an interior part of the door in a laminate design (such as disclosed for the related blinds, shutter, or door designs, incorporated herein) where the door is comprised of flexible materials like rubber, woven cloth, plastic or foam sheets, metal slats, etc. Such a door can quickly open and close for fast ingress and egress.

The barrier 230 could be flexible to allow retraction, such as by making the main portion 232 of flexible anti-ballistic sheets or mesh or netting, and making the frame 231 rollable, such as by using a chain, rope, cable, slats, etc. the material 232 would also be flexible to allow retraction and stowage. Or the barrier 230 could be formed into slats or foldable panels to allow for easier storage.

Fireproof materials can be provided on the door or barrier layer to add fire resistance to the door, and insulation can be added to protect an interior from heat of fire, for example. For example, a silica layer, silica sheet, silica cloth, or other surface treatment could be provided to add fire and heat resistance, as can other materials such as fiberglass, asbestos, etc. An air blower/fan can be provided to blow cooler air from the floor or another source upward over the door to keep it cool in case of a fire situation.

Such a door can be modified to protect against ballistic objects as well, as discussed regarding the disclosed designs, also incorporated herein. Hence, such barriers can be provided in hallways to wall-off portions of interior buildings or protect those interiors from external access, providing barriers against intruders whether on a vehicle or not, and to protect against ballistic projectiles such as bullets or shrapnel from explosions. By providing fire resistance, the barriers can also protect against the spread of fire and its resulting heat. The barriers can also protect against explosions and ballistic projectiles like bullets, shrapnel, etc.

As discussed for blind designs above and in the referenced applications, such barriers might automatically deploy upon detection of heat, an explosion, gunfire, or another alarm condition that might be automatically detected or manually activated. Emergency responders also might deploy the systems, as might burglar alarms, fire protection systems, etc.

Other options for use of such barriers in vehicle door panels and other hollow bodies include inflatable bags that can fill with an anti-ballistic gel, sand, balls or other material to provide anti-ballistic protection. Airbag type devices might also be provided that deploy outside of the body panels to protect individuals inside the vehicle, where such airbags might be comprised of anti-ballistic inflatable sheets as discussed herein or filled with anti-ballistic material such as a gel. Such systems may be automatically or manually deployed, or permanently deployed, all of which is discussed herein and in the parent applications for various barrier embodiments.

First, an automated piloting system might be automatically activated upon deployment of the barrier, such as might be found on a land vehicle or aircraft. Alternatively, displays can be used to show the environment external to the protected space.

Such a door barrier can be made sufficiently strong to stop a speeding vehicle. If the door is designed to flex and stretch, it can absorb much of the kinetic energy of moving objects without breaking, protecting an interior space and avoiding penetration by the undesirable object.

Furthermore, existing doors can be outfitted (retrofitted) with an added layer of material as disclosed hereinabove, such as by providing the ropes and/or layers of netting or other forms of the lightweight anti-ballistic material to add additional structure and energy absorption capability to an existing door. In such a situation, the retrofit barrier might be attached to the door using a glue, welding, mechanical fastener, Velcro, or other means of fastening the barrier to an existing door. Such a retrofit would allow the door to continue to be retracted or opened in the original manner.

In particular, a deployable barrier system using any of the above approaches is desired that can stop objects of substantial mass from penetrating the barrier and entering the protected space. Objects of substantial mass on the order of pounds, tens of pounds, hundreds of pounds, and thousands of pounds are contemplated to be protected against. For example, protecting against thrown objects like large rocks, bricks, liquid or solid filled bottles, rockets, missiles, mortar rounds, drones (such as drone vehicles), personnel vehicles of any size or weight, running individuals, battering rams, etc. Barriers that protect against one or more of these types of objects using strong, lightweight anti-ballistic materials is desired.

Alternative approaches where the barrier is installed in a rising manner could also be provided. For example, posts may rise out of the ground or floor for deploying the barrier from the ground up, with the top portions free to move, or with sufficient flex in the barrier to allow freedom of motion. Such devices can protect hallways, stages, rooms, doorways, garage doors, or other locations in and out of buildings.

Note that barriers that are constructed of ceramic or composite ballistic material can be much lighter and cheaper to build than barriers that use metallic materials, such as steel, for example, and they could prove flexible and more deployable and retractable.

Barriers using fabric and/or panels held together by fabric can be utilized. Also having barriers in a horizontal or vertical position. Closing and opening from all possible sides can be provided, e.g., from the top or bottom or left or right. Also, a combination of these approaches can be used. Barriers could close from both sides. Or close from the top and bottom where each barriers half covers half of a particular window.

Roll down fabric barriers using ballistic materials that come down from the top, such as that can be quickly deployed can prove useful. Also panels that fold down from the top can be utilized.

Ballistic resistant panels can be provided with the ballistic material provided on back of an ornamental design (e.g., wooden slats), or between ornamental designs, so that the barriers provide traditional ornamental aesthetics. The ballistic materials may be woven into a layered cloth that can be attached, glued, or otherwise combined with the ornamental panels to achieve the desired effect. A string or rope made of the ballistic material can be used to replace the string/rope that may be utilized in existing applications.

Figure 3A:
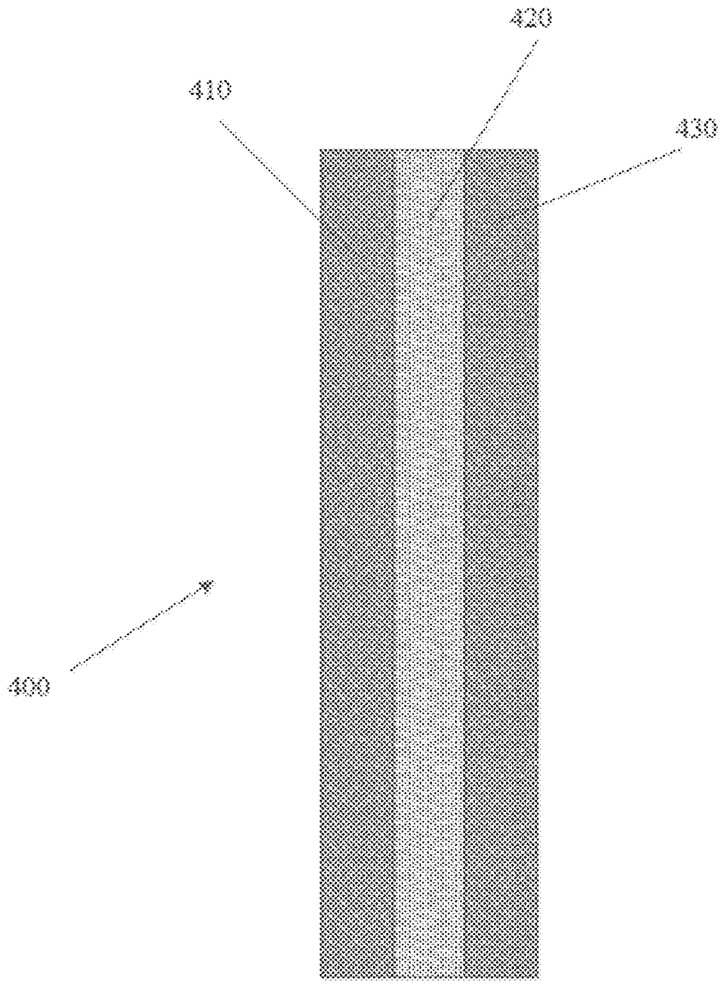
FIG. 3A illustrates an example laminated structure for a barrier that provide both decorative and anti-ballistic features.

For example, FIG. 3A shows a side view of a laminated slat 400 having ballistic layer 420 sandwiched between decorative or structural layers 410 and 430. As an example, layers 410, 430 could be a single layer of fabric surrounding a ballistic panel as layer 420. Or ballistic layer 420 might comprise a ballistic fabric (woven or unwoven), making the entire slat of layers of fabric and/or sheets of material. Hence, part of the barrier, such as louvers/slats, can be made in this laminated manner to provide both decorative and anti-ballistic features. The layers could be glued together, or bonded in some other manner, such as by heating them to weld them together or stitching them together using a strong thread, as described hereinbelow. A lamination machine that binds the layers using heat can be used.

Figure 3B:
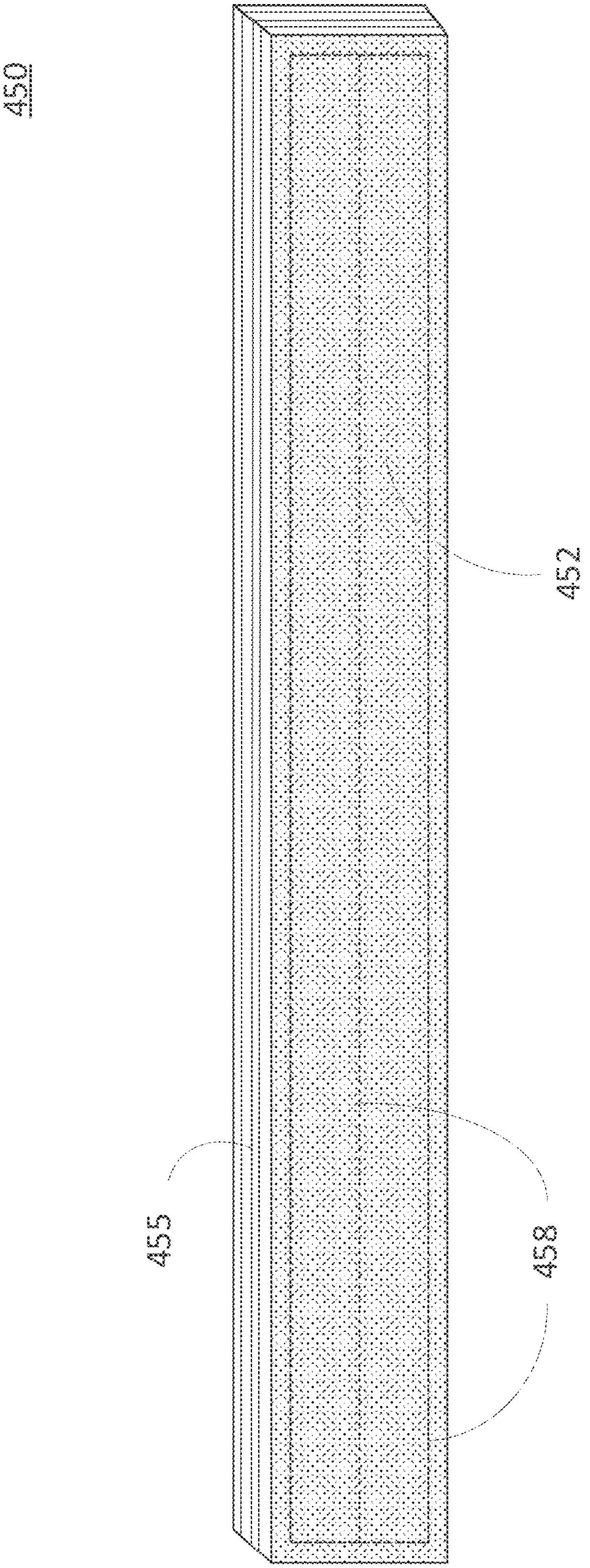
FIG. 3B illustrates another example laminated structure for barriers that provide a plurality of layers stitched together.

FIG. 3B shows an example barrier comprised of an anti-ballistic laminate 450 having a plurality of layers of flexible, anti-ballistic material 455 and a decorative (or structural) top layer 452 that are stitched together using stitching 458. An embodiment may use any number of layers of anti-ballistic material, which may be a woven cloth material or a thin sheet. For example, such a barrier might use two, or more than two such layers. In a preferred embodiment, 18 layers of level IIIA bullet proof material, such as an antiballistic cloth material or thin sheets of material as discussed above can be stacked into a laminate that can be glued, heat welded, or stitched using a thread, such as nylon, polyester, Kevlar® or Dyneema® threads, to secure the layers together. The top (and in some cases bottom as well) decorative layer 452 can be comprised of a decorative cloth or sheet. A binding material or strip can be put around the outer edge of the sheets or slats for decorative purposes or for physical support and further binding. For large sheets of materials, stitching will be provided at periodic intervals (e.g., 0.75 inch spacing).

For example, 18 plies of woven Kevlar® fabric such as a 600 d Kevlar® KM2 Plus, 24×24 square yarns per inch, plain weave construction, polyester stitching yarn, 75 denier textured yarn with a stitch pattern from a linear chain stitch (machine direction), 3.5 gage spacing or 0.75 inch spacing.

Figure 3C:
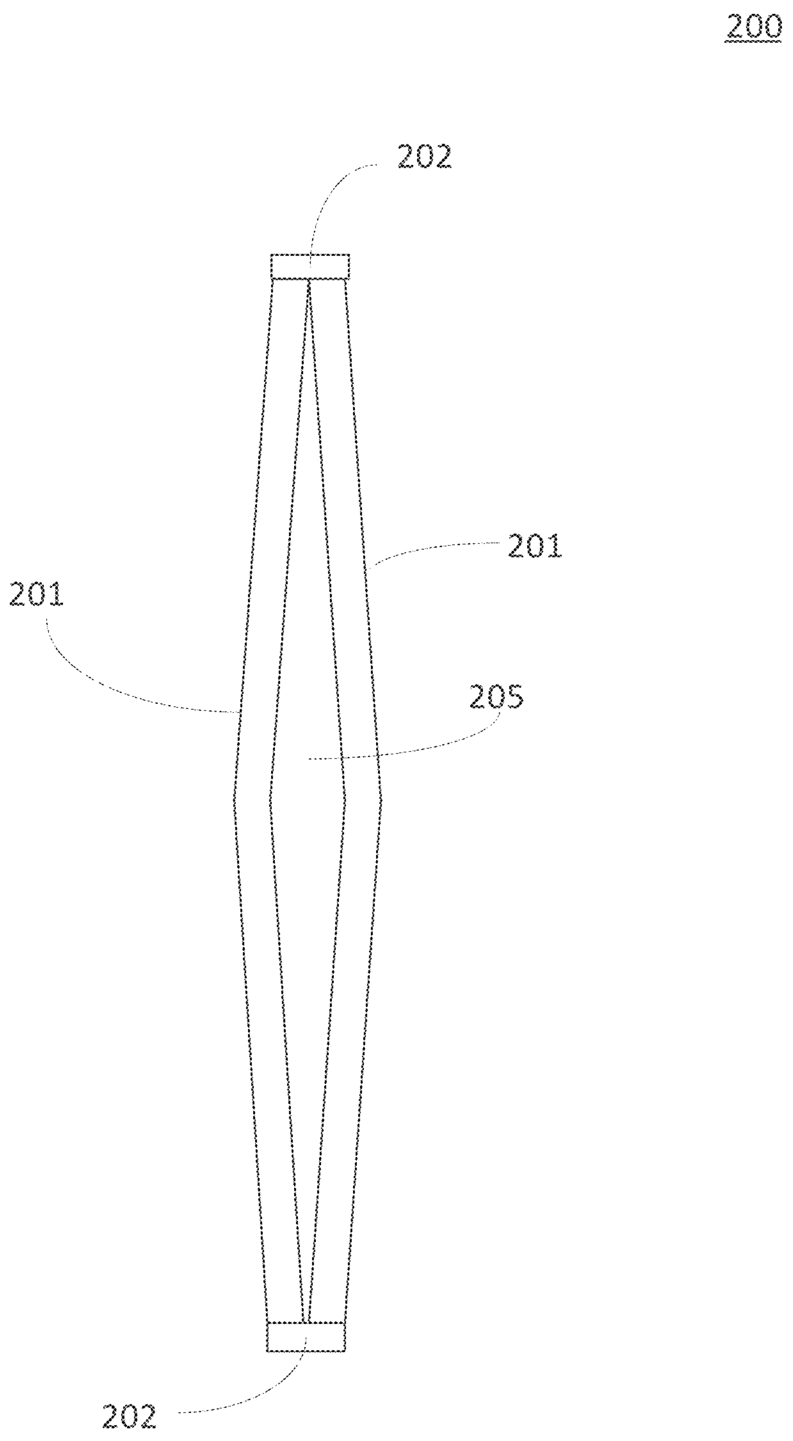
FIG. 3C illustrates another example laminated structure for barriers that provide a plurality of layers having a hollow interior.

Sheets of material of the barriers, or individual slats, may have the individual fabric sheets bound by using a glue or substance around a perimeter of the sheets or a pair of edges to hold the sheets together, but let the layers remain unbound in an interior portion. FIG. 3C shows a side view of an example two-layer laminate 200 with first and second fabric layer 201 having only upper and lower edges 202 bound with an edging material (such as stitching, bonding, edging, etc.) leaving an inner gap 205 formed from the loose material. Of course, any number of layers can be used in the laminate rather than just 2. This approach could be designed to self-destruct in order to better absorb the energy of a projectile. Or layers 201 might themselves be comprised of laminated layers of material whether a woven or unwoven cloth, or thin sheets, of anti-ballistic materials. Note that gap 205 might be filled with anti-ballistic fibers to enhance the anti-ballistic capabilities of the laminate 200.

The laminated material of FIG. 3A or 3B or 3C can be formed into slats to form venetian blind or shutter style barriers, or alternatively into sheets of any desired length or width to form solid barriers that can be used in homes or vehicles as discussed herein.

Alternatively, tensylone slats can be used for barriers, such as venetian style blinds. As an alternative, a thin layer of steel as a strike face can be provided on the slats to improve the anti-ballistic properties. Tensylon® slats, with or without the steel surface layer, can slide in pockets on the Kevlar® fabric blinds to add further protection, such as in solid sheets that are rolled up when retracted and unrolled when deployed, as described hereinabove. Such barriers re flexible and lightweight, and could be designed to level 4 protection to stop rifle rounds.

Figure 4:
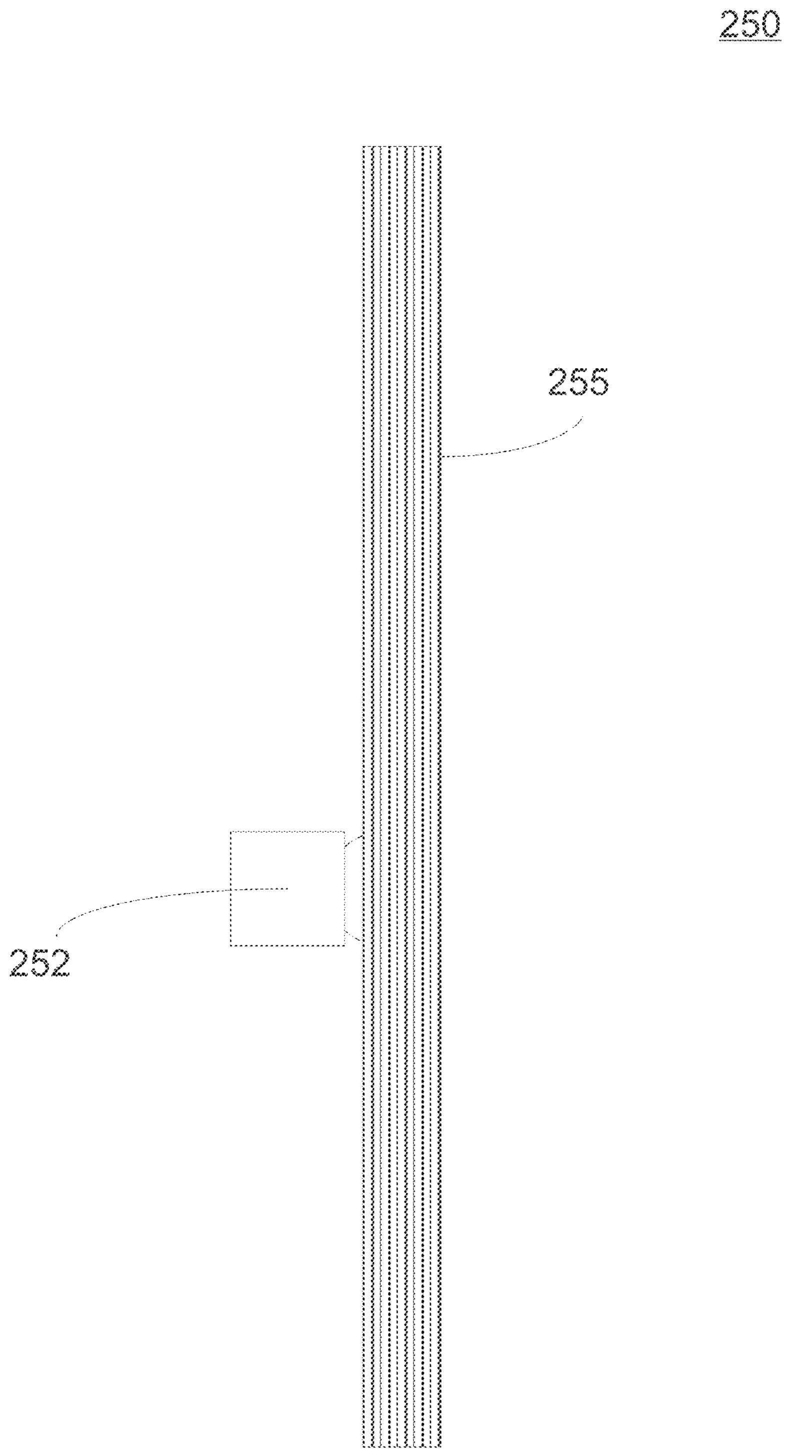
FIG. 4 illustrates an example embodiment of a barrier system including a speaker/vibrator.

FIG. 4 shows an example laminated barrier 250 with laminate 255 having a speaker (or vibrator) 252 attached to vibrate the barrier in order to provide security by preventing monitoring of the barrier (and hence the room) using a device such as a laser vibration monitor. Alternatively, the speaker might be provided at another location, such as in mounting structures. By vibrating the barrier using the speaker, the barrier essentially creates noise that make surveillance of the room more difficult. If an outer stiff layer is used on the laminate, the speaker may be attached to that layer. This approach can also be designed to provide active noise cancellation in that the speaker, rather than just creating noise, is attached to a sound detection system to actively cancel room sounds in the manner done in active sound cancellation systems. By using a microphone instead of a speaker, the barrier might be utilized to monitor ambient sounds.

Figure 5:
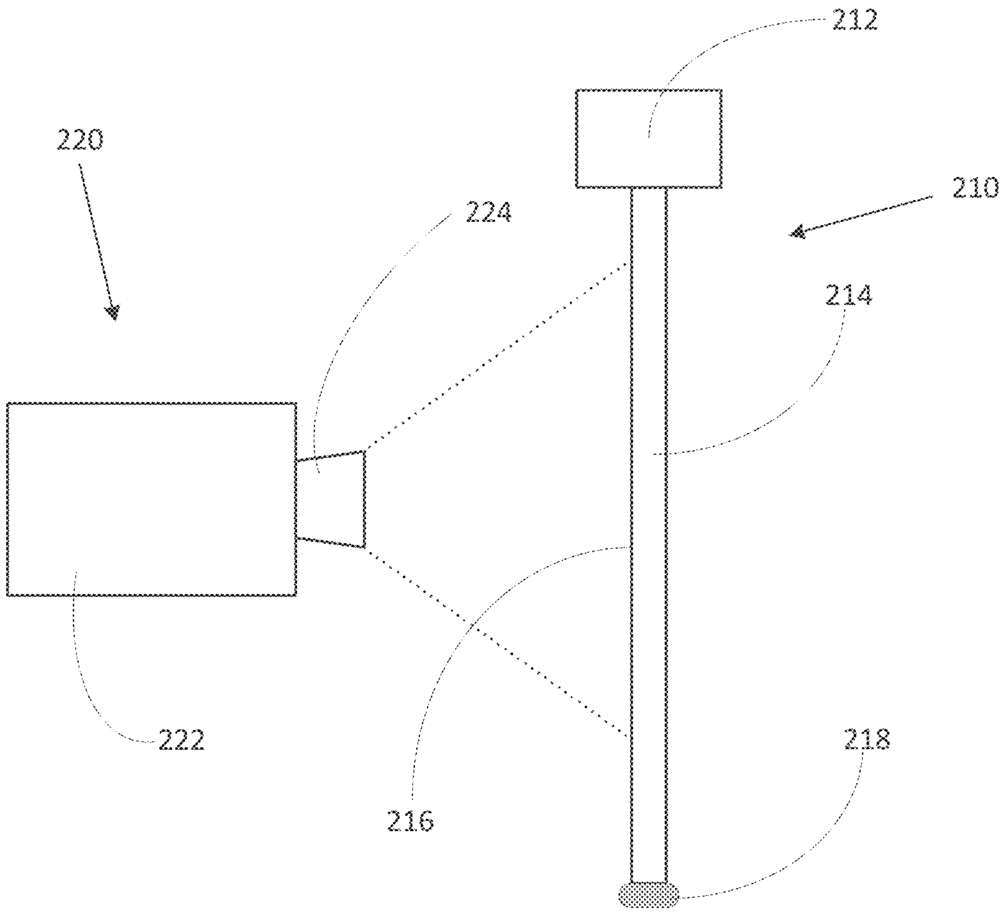
FIG. 5 illustrates an example embodiment of a barrier system including a projector.

FIG. 5 shows a projector barrier system 200 having a deployable barrier system 210 and a projection system 220. The barrier system 210 can be any of a number of barrier systems already proposed, but in this example a drop-down, flexible barrier 214 (such as the flexible laminated barrier discussed above and/or in the related applications) is deployed from a mounting and retracting structure 212. An optional weight 218 is provided to add mass to the system and aid in deployment. The barrier system 210 is provided with a projector screen surface 216 that is treated to operate as a satisfactory projector screen for receiving a projected image from lens 224 of the projector 222.

The projector screen surface 216 provided on the barrier 214 is configured in a manner to provide a good image projection. For example, a matte, clean, white, highly reflective surface can be provided to ensure that a strong image is provided on the barrier. This surface 216 may be an additional layer provided on the laminate forming the barrier 214 (which may be made a part of the laminate, or as the outer decorative layer of the laminate), or it may be a surface treatment such as a coating, paint, or other approach.

The projector system 220 can be any of a number of current or future projecting systems, such as miniature projectors that can be mounted on a ceiling, floor, wall, or other mounting structure of the protected space. The projector would project an image that is obtained from one or more cameras (video) that are mounted in a position to maintain a view of at least a portion of the environment that is outside of the protected space. For example, the camera system could be mounted to show a view outside a window that is protected by the barrier, in a manner that projects what would be seen through the window if the barrier were not deployed. The projector system might also display images obtained from a remote system.

The projector can also provide additional information that can be gathered from various sources, such as sensor readings showing various external conditions. For example, motion detector results, temperature readings, infrared images, weather reports, news and/or police reports, etc. can all be added to the projection.

If the projector barrier system is protecting an occupant of a vehicle, for example, the projector might also project information such as surrounding images (e.g., back, side, front, overhead, all displayed on a barrier covering a windshield), speeds, weather, traffic information, escape routes and other directions, maps, etc.). If the barrier is provided in an aircraft, flight instruments readings can be displayed. On a boat, marine conditions might be displayed. In essence, any information that is of use to the occupant can be integrated into the image that is displayed on the "screen" of the barrier.

Note that for some embodiments, multiple projectors might be used for different windows that might be protected, or a multi-lens projector could be used. The projector might be movable, such as rotatable, for example. It might be removable, or might be integrated with another device, such as a cell phone, GPS navigation system, etc.

Figure 6:
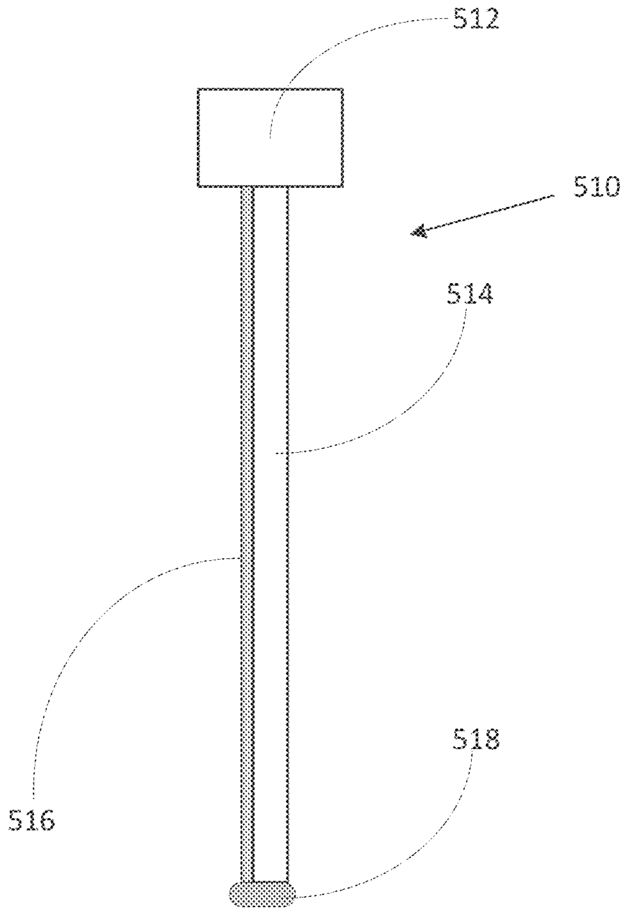
FIG. 6 illustrates an example embodiment of a barrier system incorporating a display.

FIG. 6 shows an alternative embodiment, where a display barrier system 500 is provided with a barrier system 510 and an integrated display 516 integrated with the deployable barrier system 510 to provide the display material, such as described above for the projector system. The barrier system 510 can be any of a number of barrier systems already proposed, but in this example a drop-down barrier 514 (such as the flexible laminated barrier discussed hereinabove and/or in the related applications) is deployed from a mounting and retracting structure 512. An optional weight 518 is provided to add mass to the system and aid in deployment. The barrier system 510 is provided with an integrated display 516 which may be a flexible LCD or LED screen that is laminated or otherwise mounted on the barrier 514 and which can be "rolled up" with the barrier 514 for retraction within the structure 512. Printed screens are also feasible. This display 516 is sufficiently flexible to retract with the barrier 514 into the mounting and retracting structure 512, which would include the display electronics to drive the display 516.

This system of FIG. 6 can display any of the information described above for the projection system, but provides the added benefit of not needed an external projector to be installed, and also provides the other benefits of a self-contained display. Where necessary, this display may have backlights or externally projected lights to support the displayed image. Alternatively, other technologies other than typical LCD displays might be used, such as organic LED, traditional LED, plasma phosphors, or other display technologies can be utilized with their respective benefits.

Another alternative is to use a separate display for showing the external environment. Such a display might be added to the protected space, or it might already be present, such as on a navigation or other video system (such as a backup video system on a land vehicle, or a heads-up display on an aircraft).

Any of these embodiments of a deployable barrier with display capability could be used in any of the applications disclosed herein or in the related applications.

Figure 7:
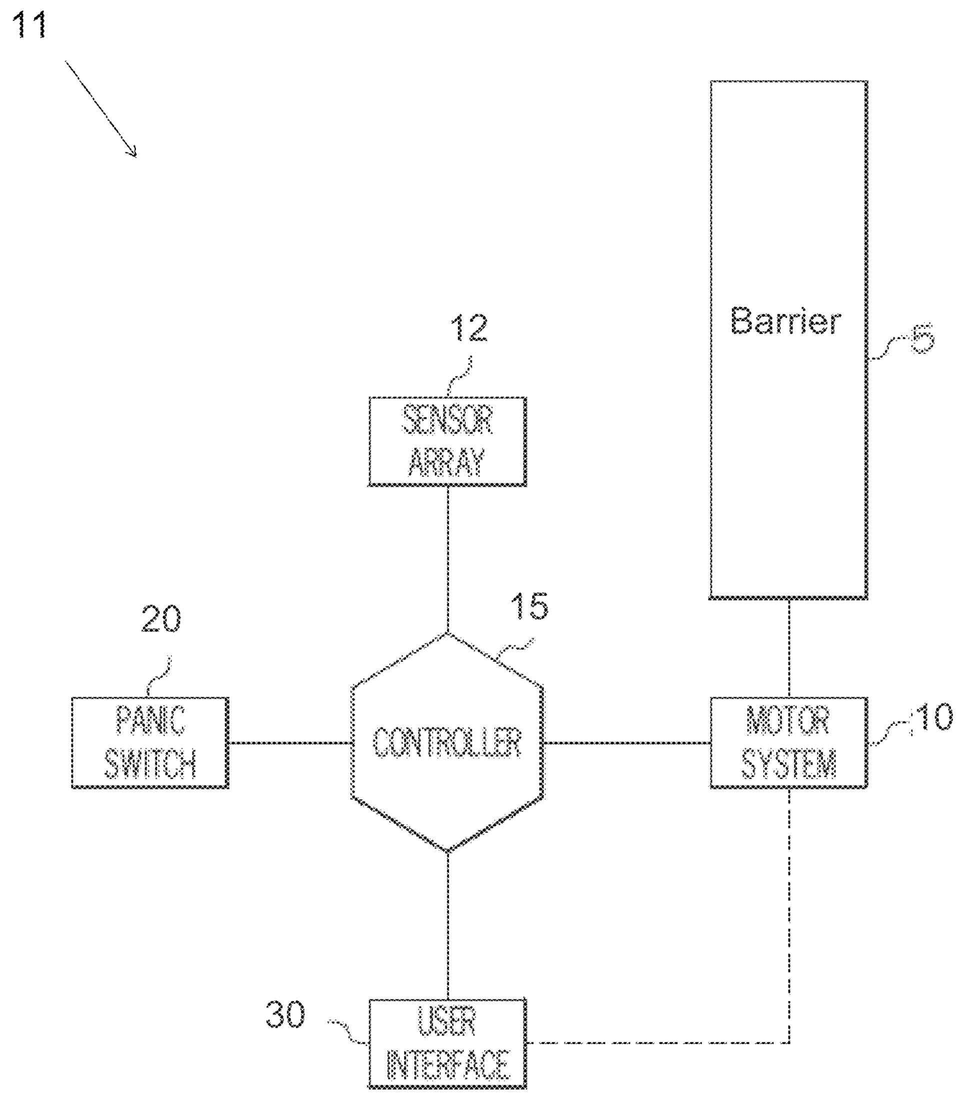
FIG. 7 illustrates an example control system for an automated, deployable barrier system.

FIG. 7. Illustrates an example of a control system 11 which may be used by any of the embodiments described herein to control the barrier system 5. The control system can include a controller 15 with one or more sensors that form a sensor array 12 connected to the controller 15, and a panic switch 20 connected to the controller 15. The sensors may be pre-existing sensors in a home defense system or conventional after-market sensors capable of detecting ballistic signals such as sound (e.g., gun shots or breaking glass), gun powder, gun impact, muzzle flash, temperature, and the like. The sensors could be any of those typically used to detect a break in, for example. The controller 15 is connected to a user interface 30 whereby a user may activate and apply settings to the barrier system. The controller 15 is also connected to a motor system 10 for actuating the barrier system upon receiving information indicating that a threat is present and that the barrier should be deployed (i.e., put into a protective state such as a ballistic protection mode).

Where a building may already have a central control system (e.g., a security or other alarm system with computer control), controller 15 may utilize such a system by adding additional customized code for operating the barrier system 5. In another example, the barrier system could also utilize ground sourced radar, infrared (heat), sonar, or some other active or passive detection system. The sensor array 12 can include one or more heat sensors, infrared sensors, video sensors, audio sensors, smoke detectors, or other types of sensors, or may utilize already existing sensors of a fire or burglar system, for example. Any of the sensors in the sensor array 12, the panic switch 20 or the user interface 30, or any combination of these components, may be connected to the controller 15 in a wireless manner, such as by WiFi or Bluetooth, for example, and the panic switch and/or user interface could be implemented on a cell phone or tablet computer, for example.

Alternatively, the control system 11 might be part of a smart system such as smart speakers or a burglar alarm system using such devices.

The system or any of its components may be controlled by any external or internal system, such as one that may exist prior to the installation of the barrier(s). For example, the barrier system could be tied to an external system such as an alarm system or video cameras with analytics. The barrier system could also be controlled remotely via the internet or a WiFi or Bluetooth® connection by any connected device such as a tablet, computer, PDA, or a smartphone. Barriers such as disclosed herein would be very useful in a panic situation in a school or federal building. Such barriers could also be used in a lock down situation to prevent people or valuables from leaving the premises, for example.

The control system 11 of FIG. 7 can be networked with other smart systems that are used in a home, business, or other location. For example, other devices that are actively "listening" to ambient noises or "watching" for activities could be used as sensors to monitor for sounds that indicate a location is under attack for communication to a control system. Sounds such as explosions or gunshots, smoke (and other gunfire or explosive products), breaking glass, explosions, or voice command (e.g., "deploy barrier" or "deploy blinds"), to deploy the barrier or blinds. For example, the Amazon® Echo® device (or the similar Echo® Dot®, Echo Show®, Echo Plus®, Echo Spot®, Echo Auto®, fire devices, among other devices), using the Alexa® application (or a related application, such as the Amazon® Alexa Guard® app), can actively listen to ambient room noise, and could be utilized to monitor for such emergency sounds and then respond by actively deploying the barriers, using Alexa's automation applications.

Similar devices marketed by Apple®, Google®, Sonos®, and other vendors could be substituted for the Amazon® devices. These devices have WiFi and Bluetooth® connectivity, and connect to such other monitoring devices as video cameras (e.g., Blink®), and video doorbells (Ring®), etc., which permit active networking of devices to respond in concert to any detected threat by audio, or, when using video devices, by video (such as detecting a person holding a gun or other weapon, etc.).

Figure 8:
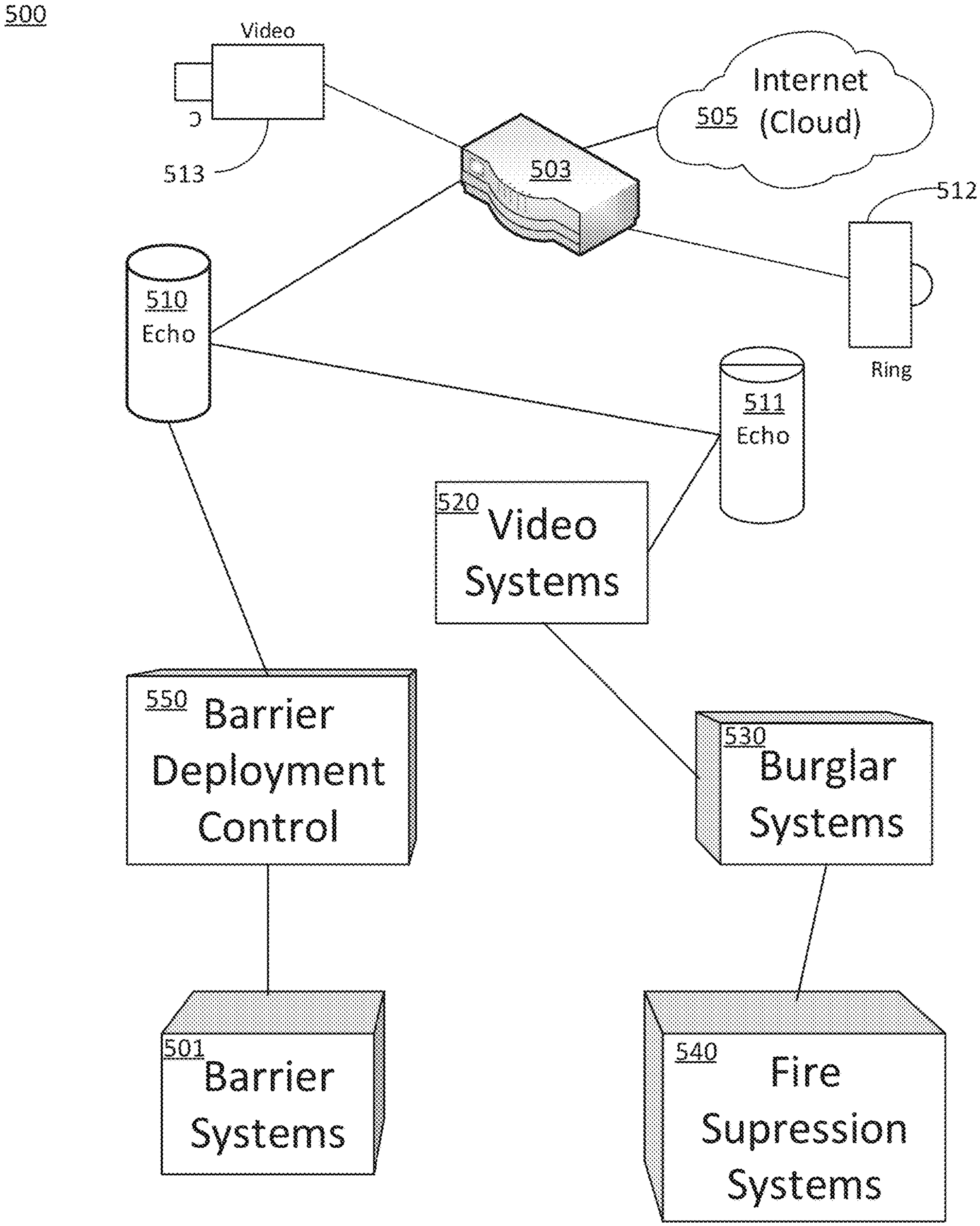
FIG. 8 illustrates an example embodiment of a networked system for integrating an automated deployable barrier system with smart speakers and other protective systems.

FIG. 8 provides an example integrated system 500 that can be provided for automating a barrier deployment system. In this case, a router 503 (such as a wireless or wired ethernet system or cable modem system) connects to the Internet 505 to access cloud services and remote servers. The router provides internal network connectivity to the other networked components. In this example, Echo® devices 510, 511 are attached to the network, such as via WiFi connectivity. Ring® doorbell systems 512 can be used to provide external video. Video cameras 513 used with Video systems 520 can also be attached, along with any burglar systems 530, Fire suppression systems 540, and other types of systems that monitor a region using sensors, video, panic switches, etc.

A Barrier Deployment Control system 550 can be provided to control any Barrier Systems 501 with automatically deployable barriers. In this way, the various systems communicate with each other in a shared, artificial intelligence environment to share sensor information gathered by each of the systems, and to operate the systems in an integrated, coordinated manner. Hence, when a burglar system detects an intrusion, barriers might be deployed to protect entrances. Similarly, if smart speakers detect breaking glass or gunshots, a burglar system might set off an alarm, and notify security personnel.

For example, an Alexa® activated device can send Smart Alerts®, via phone notifications, if an Echo® device detects the sound of smoke alarms, carbon monoxide alarms, commands, or glass breaking. Alexa® could automatically control barrier deployment, compatible smart lights to make it look like someone is home, notify authorities, etc. Alexa® can also arm a Ring® or Blink® or ADT® security system, call authorities, or set off alarms. This can include integration with other smart devices, such as smart locks, security systems, contact/motion sensors, etc.

Echo® running Alexa® and similar devices can be provided in multiple rooms and buildings and integrate with other safety systems such as security cameras and fire suppression systems. Alexa® could direct children or law enforcement where to go to get away from any threat whether it's an active shooter or a fire. Distributed smart speakers can help guide individuals to safety by directing them to safe areas or exits. In addition to audio it could give visual clues perhaps color codes for deaf people. Visual clues could be seen from a much further distance. When integrated to blue tooth and WiFi it could alert and direct children on their phone to evade/escape. The system can be used to pinpoint locations of people/children and guide them through smoke or darkness, including through heavy smoke or away from an active shooter, for example.

By using Alexa® devices and applications in numerous classrooms or offices one can pinpoint the location of the shooter. For example if there is a courtyard with surrounding classrooms, a shooter could be monitored and followed. Or in a residential community with multiple residences or in a city with multiple offices and buildings all the Alexa® devices can share information such as gunshot glass breakage smoke heat etc. To help authorities or building systems pinpoint the location of threats to take offensive defensive measures. The system could also change colors and flash so the fire department or police could have visual alerts. These audio or visual alerts could also guide the children or office worker where to go to evade the assailants. By sharing information between multiple integrated systems, problems can be detected and actions can be taken. Lights doors ventilation etc.

Alexa® can also be used in utility rooms and data centers for predictive maintenance when heat sound or light than corresponds to various problems. For example a heat exchanger fan motor could be replaced based on the change in sound or temperature. Alexa® could also take weather into account to control various systems and predict outages for as simple as replacing lights.

Security components such as Ring® doorbell systems, video systems, window detection sensors, heat sensors, smoke sensors, etc. can all be integrated together and used to determine the status of an enclosure (e.g., home, business, store, etc.) or another location (yard, street, park, etc.) and the proper protective devices triggered, alarms activated, and proper people and other systems notified.

Similar devices could be added or substituted for the above described devices, such as Google's° Home ° devices (e.g., Home Mini, Big Home Max, Home Hub), Apple® HomePod®, Harman-Kardon Allure® and Invoke®, Lenovo Smart Display®, Triby Smart Speaker®, Mycroft Mark 1®, JBL Link View Smart Speaker®, Sonos One®, among others, along with the Apple® Siri® app and the Windows® Cortana®. Any of these systems and/or applications could be adapted in a similar manner as discussed above with respect to the Alexa® devices.

Such systems could also be utilized to deploy burglar defense systems such as disclosed in U.S. Pat. No. 10,229,569 filed on Mar. 14, 2014, and incorporated herein by reference, that deploy anti-burglar substances such as pepper spray or tear gas or identification inks. These systems can then be used to deter burglars and other invasion attempts.

By networking the various smart systems, including microphones to monitor sound and voices (including gunshots, breaking glass, etc.), video cameras to capture faces, movement, and break-ins, heat and smoke detectors to detect fires, cell phone detectors can be used track individuals by using Bluetooth® or other cell phone features (with individuals registering their phones with the protective system), and other types of sensors, a protected space can be monitored for potential intrusion and other threats. The use of voice and face recognition can be used to register residents and guests to detect unauthorized intruders, for example. When threats are detected, various defensive measures can be deployed, such as deploying automated barriers (as discussed herein), triggering alarms, calling the proper authorities (fire or police, for example), starting recordings of video and audio activity, deploying defensive gas or liquid deterrents, etc.

The barriers could be retrofitted to an existing building or other structure, and adapted to tap into existing security or burglar alarm systems, for example, or they could be added during structure construction.

The barriers could also be adapted to sense the location of the occupants of the building and close by according to predetermined parameters such as direction of threat and the location inside the building that would be the best to return fire from. barriers could also be controlled by facial recognition, video analytics, or by the occupants' voice or any other suitable biometrics, such as for recognizing an threatening person, such as an ex-spouse, or ex-employee who has made threats or acted in a threatening manner, or otherwise recognizing a wanted criminal or an enemy soldier, for example. When a barrier system is activated, the barrier may deploy as discussed above so as deflect bullets, shells, or other ballistic weapons to prevent a fatal impact and/or property damage. Such barriers can protect from thrown objects as well, such as rocks, grenades, bricks, molotov cocktails, etc. Barriers could be controlled individually or together with a timing mechanism.

The barriers could be configured to protect against remote monitoring of sound and conversation, such as by providing random vibrations to the barrier to avoid vibration detection by remote monitoring devices, for example.

As an example use, the barrier system may be provided in an open state where the barriers are provided in an retracted condition to allow viewing or travel through the barriers, or the barriers in a retracted position. The barrier system sensor array would detect a potential intruder or the sound of gunfire using visual, auditory, or other sensed information. The system would then automatically enter a protective state, such as by deploying the barrier (by lowering it to protect a space), or both, to protect the interior of the room from external entry of projectiles (e.g., bullets), for example. Or the system may detect the entry of a ballistic projectile (e.g., a bullet, rock, etc.), or threatening shouts or yells, sirens, explosions, proximity of threatening individuals, etc., in which case the barrier would be activated into a protective mode.

Figure 9:
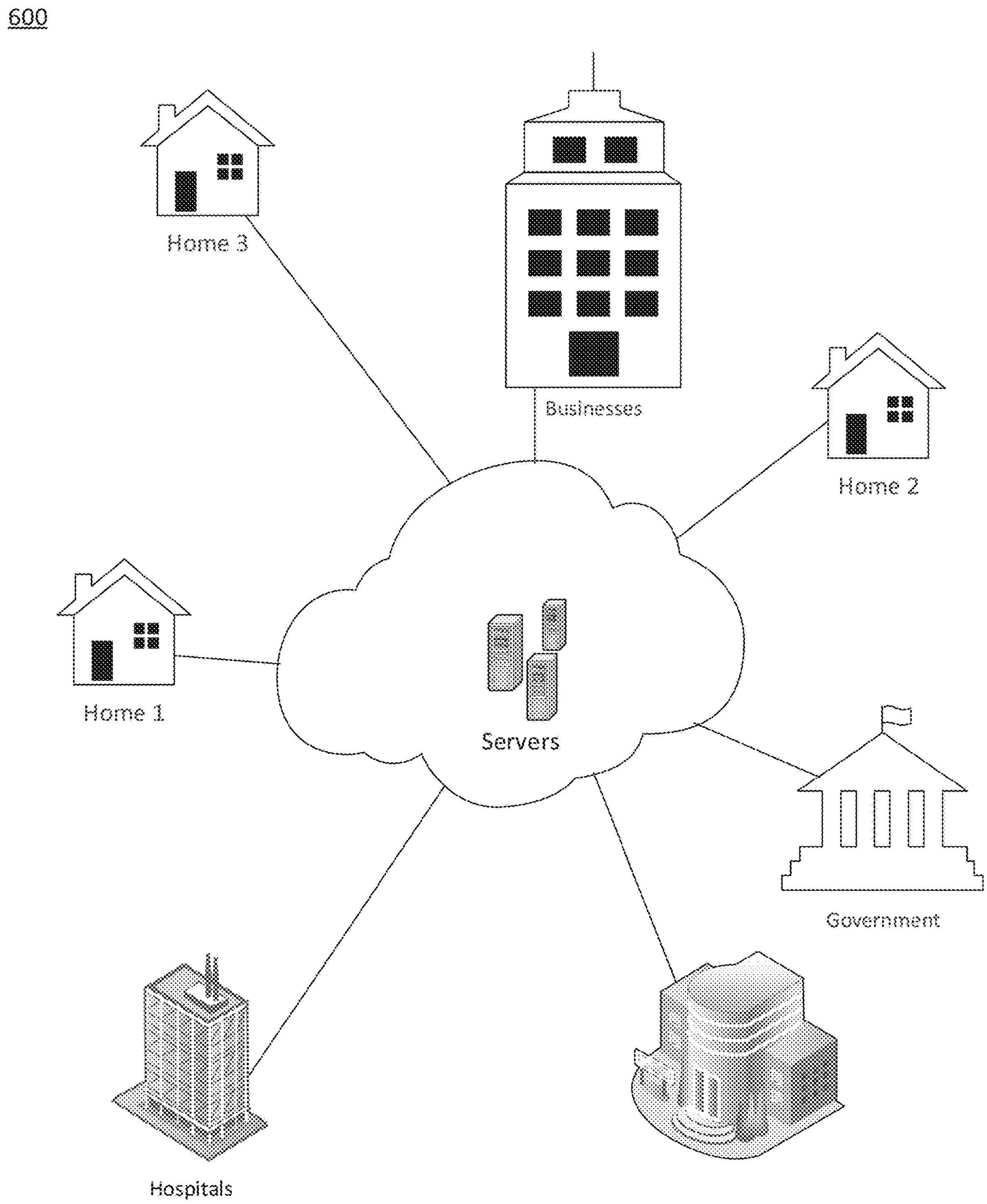
FIG. 9 illustrates an example expanded network of connectivity to neighborhoods.

FIG. 9 shows an example networked neighborhood 600 where multiple homes, businesses, institutions, and safety forces are networked together to share information gathered by systems that can be installed in any, or all, of these locations. For example, a home under invasion can detect the invasion, and potentially broadcast a warning to neighbors, notify police, and in case of fire detection, notify the fire department. Hospitals may be notified if there are injured individuals detected, and government agencies may be notified for tracking and statistical analysis, and for long-term response and legislation and policies, for example. Businesses might be notified of the performance and status of their various products.

Furthermore, individuals (e.g., relatives, stakeholders, officials) located more remotely anywhere in the country or even in the world may be notified where desired. Individuals who are not home during a break-in can have their smart phones notified, and be provided video information, for example. Friends or relatives can be notified of problems, injuries, health emergencies, etc. These systems can be used to monitor medical conditions of individuals in the home or in hospitals or other care facilities. Security personnel can be notified of situations that they must respond to. In this way, all interested parties can be kept apprised of events that impact them.

When these systems are installed in homes, businesses, or other locations, constant monitoring of background noise and appliances, and other devices or people can be used to detect anomalies, such as impending product or appliance failures, gas and electric system status, weather conditions, etc. Remotely located relatives can monitor their elderly parents, siblings, grandparents, etc. The systems can monitor electrical power, water, natural gas, propane, internet, and other utility usage for detecting anomalies and other unusual circumstances, and to perform assessments and monitoring.

Devices deployed in vehicles such as boats, planes, automobiles, trucks, etc. can be used to monitor drivers, passengers, and the vehicles themselves for any sign of problems, crises, threats, emergencies, etc. These devices could interact with internal vehicle systems as well.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A system for protecting a space from a ballistic projectile, comprising:

- a plurality of monitoring devices distributed about and/or around the space, at least one of said monitoring devices being configured to access a remote server to receive information from said remote server about responding to threat data, said monitoring devices configured to monitor the space for the threat data indicating one or more potential threats;
- a controller for receiving information from the plurality of monitoring devices, said controller being configured to analyze the threat data to determine if a potential threat exists;
- at least one deployable barrier comprising a flexible anti-ballistic material configured to stop the ballistic projectile; and
- a deployment subsystem for automatically deploying said deployable barrier, wherein
- upon detecting that a potential threat exists, the controller is configured to signal said deployment subsystem to deploy said deployable barrier into a protective state to protect said space.

2. The system of claim 1, wherein said at least one of said monitoring devices is a smart speaker networked with the remote server, said smart speaker being configured to interact with one or more individuals within said space.

3. The system of claim 1, wherein said at least one of said monitoring devices is a video system including a video camera.

4. The system of claim 1, wherein said at least one of said monitoring devices is a doorbell including a video camera.

5. The system of claim 1, wherein said deployable barrier is a door comprised of a laminate including a plurality of layers of individual flexible sheets laminated together, each flexible sheet including anti-ballistic fibers woven into a cloth.

6. The system of claim 1, wherein said deployable barrier is a window blind comprised of a laminate including said anti-ballistic material, said system including a mounting structure configured to mount in or at a window frame of a window, said mounting structure configured to stow said deployable barrier into a stowed position when not deployed.

7. The system of claim 1, wherein said flexible anti-ballistic material is comprised of a plurality of layers of individual flexible sheets laminated together, each flexible sheet including anti-ballistic fibers woven into a cloth.

8. The system of claim 1, wherein said controller is comprised in at least one of said monitoring devices and is configured to notify safety personnel that said potential threat exists, and wherein said controller is configured to receive information from said safety personnel on how to respond to said threat.

9. The system of claim 1, wherein said threat data includes data detecting a gunshot.

10. The system of claim 1, wherein said threat data includes data detecting a breaking glass.

11. The system of claim 1 further comprising a repellant deployment device, wherein upon detecting that the potential threat exists, a repelling substance is deployed by said repellant deployment device to repel or disable an intruder.

12. A method for protecting a space from a ballistic projectile, comprising the steps of:

- monitoring said space using a plurality of monitoring devices distributed about and/or around said space for detecting threat data, at least one of said monitoring devices being configured to access a remote server;
- each of said monitoring devices transmitting its threat data to a controller;
- said controller analyzing said transmitted threat data for determining if a potential threat exists; and
- upon determining that a potential threat exists, deploying a deployable barrier including an anti-ballistic material to protect said space from said ballistic projectile, and
- also upon determining that a potential threat exists, issuing audio instructions audible to any persons within said space with safety instructions for said persons to follow.

13. The method of claim 12, wherein at least one of said monitoring devices is a smart speaker configured to interact with one or more individuals within said space, said smart speaker being configured to issue said safety instructions.

14. The method of claim 12, wherein said flexible anti-ballistic material is comprised of a plurality of layers of individual flexible sheets laminated together, each flexible sheet including anti-ballistic fibers woven into a cloth.

15. The method of claim 12 further comprising the step of, upon detecting that the potential threat exists, deploying a repelling substance by a repellant deployment device to repel or disable an intruder.

16. The method of claim 12 further comprising the step of notifying safety personnel that said potential threat exists.

17. The system of claim 12, wherein said threat data includes data detecting a gunshot.

18. The system of claim 12, wherein said threat data includes data detecting a breaking glass.

19. A method for protecting an interior space of a building from a ballistic projectile, comprising the steps of:

- providing a deployable barrier comprising a plurality of layers of individual flexible sheets laminated together, each one of said flexible sheets including anti-ballistic fibers woven into a cloth;
- installing said deployable barrier in said building;
- retracting said deployable barrier into a stowed configuration while said deployable barrier is installed in said building;
- monitoring said space using a plurality of monitoring devices distributed about and/or around said space for detecting threat data, at least one of said monitoring devices including a smart speaker configured to interact with one or more users via audio communication, at least one of said monitoring devices being configured to access a remote server,
- each one of said monitoring devices transmitting its threat data to a controller;

said controller analyzing said transmitted threat data for determining if a potential threat exists;

upon determining that a potential threat exists, deploying the deployable barrier to protect said interior space from said ballistic projectile, and also upon determining that a potential threat exists, issuing audio instructions audible to any persons within said space with safety instructions for said persons to follow, and also upon determining that a potential threat exists, notifying remotely located safety personnel of said threat.

20. The method of claim 19, wherein said deployable barrier is a window blind including a mounting structure mounted in or at a window frame of a window, said mounting structure configured to stow said deployable barrier into a stowed position said deployable barrier is in the retracted position.

21. The method of claim 12, wherein said safety instructions are specifically appropriate for a type of said threat.

22. The system of claim 8, wherein said information received from said safety personnel includes providing instructions to one or more persons on how to respond to said threat.

* * * * *